(12) United States Patent
Trainoff et al.

(10) Patent No.: US 12,313,606 B2
(45) Date of Patent: May 27, 2025

(54) FIELD FLOW FRACTIONATOR CONFIGURED TO PREVENT LEAKAGE

(71) Applicant: Wyatt Technology, LLC, Goleta, CA (US)

(72) Inventors: Steven P. Trainoff, Santa Barbara, CA (US); Kyle C. Ellis, Huntington Beach, CA (US)

(73) Assignee: Wyatt Technology, LLC, Goleta, CA (US)

( * ) Notice: Subject to any disclaimer, the term of this patent is extended or adjusted under 35 U.S.C. 154(b) by 307 days.

(21) Appl. No.: 17/979,749

(22) Filed: Nov. 2, 2022

(65) Prior Publication Data

US 2023/0134435 A1 May 4, 2023

Related U.S. Application Data

(60) Provisional application No. 63/274,910, filed on Nov. 2, 2021.

(51) Int. Cl.
*G01N 30/00* (2006.01)
*B01D 61/00* (2006.01)

(52) U.S. Cl.
CPC ......... *G01N 30/0005* (2013.01); *B01D 61/00* (2013.01); *B01D 2315/10* (2013.01)

(58) Field of Classification Search
None
See application file for complete search history.

(56) References Cited

U.S. PATENT DOCUMENTS

| 8,163,182 B2 * | 4/2012 | Wyatt | G01N 30/0005 |
| | | | 210/321.75 |
| 8,360,244 B2 * | 1/2013 | Wyatt | G01N 30/0005 |
| | | | 209/250 |
| 11,890,580 B2 * | 2/2024 | Trainoff | G01N 30/0005 |
| 2008/0003689 A1 * | 1/2008 | Lee | G01N 30/0005 |
| | | | 436/174 |

(Continued)

OTHER PUBLICATIONS

International Search Report and Written Opinion in PCT/US2023/028558 mailed on Oct. 13, 2023.

(Continued)

*Primary Examiner* — Peter J Macchiarolo
*Assistant Examiner* — Jermaine L Jenkins
(74) *Attorney, Agent, or Firm* — Schmeiser, Olsen & Watts LLP; Leonard Guzman, Esq.

(57) ABSTRACT

Described is a field flow fractionator including (1) a top plate assembly including a first non-corrosive material, at least three fluid fittings machined into the first non corrosive material, a top cavity machined into the first non-corrosive material, and at least one top plate o-ring configured to form a horizontal geometry of a separation channel, (2) a membrane, (3) a bottom plate assembly including a second non-corrosive material, a bottom cavity machined into the second non-corrosive material, a frit configured to be placed into the bottom cavity, and at least one bottom plate o-ring configured to seal the bottom plate assembly to the top plate assembly, such that a top surface of the second non-corrosive material and a top surface of the frit are machined to be coplanar, and (4) where the top plate assembly, the membrane, and the bottom assembly define the separation channel.

12 Claims, 13 Drawing Sheets

(56) References Cited

U.S. PATENT DOCUMENTS

2022/0118407 A1    4/2022   Trainoff
2022/0134286 A1    5/2022   Trainoff

OTHER PUBLICATIONS

"Making Flow Field-Flow Fractionation (FFF) Easier with Fixed-Height Channels," AZO Materials, May 21, 2021. https://www.azom.com/article.aspx?ArticleID=20443.

"Eclipse NEON—Wyatt Technology," Wyatt Technology, Oct. 5, 2022. http://web.archive.org/web/20221005194103/https://wyatt.com/products/instruments/eclipse-field-flow-fractionation-system.html#eclipseneon-6.

* cited by examiner

FIELD FLOW FRACTIONATOR CONFIGURED TO PREVENT LEAKAGE

PRIORITY

This application claims priority to U.S. Provisional Patent Application No. 63/274,910, filed Nov. 2, 2021.

BACKGROUND

The present disclosure relates to field flow fractionators, and more specifically, to a field flow fractionator.

SUMMARY

The present disclosure describes a field flow fractionator (FFF) including (1) a top plate assembly including (a) a first non-corrosive material, (b) at least three fluid fittings machined into the first non-corrosive material, (c) a top cavity machined into the first non-corrosive material, and (d) at least one top plate o-ring configured to form a horizontal geometry of a separation channel, (2) a membrane, (3) a bottom plate assembly including (a) a second non-corrosive material, (b) a bottom cavity machined into the second non-corrosive material, (c) a frit configured to be placed into the bottom cavity, and (d) at least one bottom plate o-ring configured to seal the bottom plate assembly to the top plate assembly, such that a top surface of the second non-corrosive material and a top surface of the frit are machined to be coplanar, and (4) where the top plate assembly, the membrane, and the bottom assembly define the separation channel, where the top plate assembly is configured to be in direct contact with the bottom plate assembly upon assembly of the field flow fractionator.

DETAILED DESCRIPTION

The present disclosure describes a field flow fractionator (FFF) including (1) a top plate assembly including (a) a first non-corrosive material, (b) at least three fluid fittings machined into the first non-corrosive material, (c) a top cavity machined into the first non-corrosive material, and (d) at least one top plate o-ring configured to form a horizontal geometry of a separation channel, (2) a membrane, (3) a bottom plate assembly including (a) a second non-corrosive material, (b) a bottom cavity machined into the second non-corrosive material, (c) a frit configured to be placed into the bottom cavity, and (d) at least one bottom plate o-ring configured to seal the bottom plate assembly to the top plate assembly, such that a top surface of the second non-corrosive material and a top surface of the frit are machined to be coplanar, and (4) where the top plate assembly, the membrane, and the bottom assembly define the separation channel, where the top plate assembly is configured to be in direct contact with the bottom plate assembly upon assembly of the field flow fractionator. In an embodiment, the at least three fluid fittings include a fitting for an in-flow, a fitting for an out-flow, and a fitting for a cross-flow. In an embodiment, the top cavity has a depth of 400 μm to 650 μm. In an embodiment, the top plate assembly includes a dove tail o-ring groove configured to hold the top plate o-ring. In an embodiment, the membrane has a thickness of approximately 150 μm. In an embodiment, the height of the channel is the difference between the depth of the top cavity and the thickness of the membrane.

In an embodiment, the bottom plate o-ring is configured to prevent leakage from the field flow fractionator. In an embodiment, the top surface of the second non-corrosive material and the top surface of the frit are machined to be coplanar by at least one of surface grinding, sanding, and lapping. In an embodiment, the top plate assembly being in direct contact with the bottom plate assembly upon assembly of the field flow fractionator eliminates the need for a torque wrench to assemble the field flow fractionator.

Definitions

Particle

A particle may be a constituent of a liquid sample aliquot. Such particles may be molecules of varying types and sizes, nanoparticles, virus like particles, liposomes, emulsions, bacteria, and colloids. These particles may range in size on the order of nanometer to microns.

Analysis of Macromolecular or Particle Species in Solution

The analysis of macromolecular or particle species in solution may be achieved by preparing a sample in an appropriate solvent and then injecting an aliquot thereof into a separation system such as a liquid chromatography (LC) column or field flow fractionation (FFF) channel where the different species of particles contained within the sample are separated into their various constituencies. Once separated, generally based on size, mass, or column affinity, the samples may be subjected to analysis by means of light scattering, refractive index, ultraviolet absorption, electrophoretic mobility, and viscometric response.

Field Flow Fractionation

The separation of particles in a solution by means of field flow fractionation, FFF, was studied and developed extensively by J. C. Giddings beginning in the early 1960s. The basis of these techniques lies in the interaction of a channel-constrained sample and an impressed field applied perpendicular to the direction of flow. Among those techniques of current interest is cross flow FFF, often called symmetric flow (SF1FFF), where an impressed field is achieved by introducing a secondary flow perpendicular to the sample borne fluid within the channel. There are several variations of this technique including asymmetric flow FFF (i.e., A4F), and hollow fiber (H4F) flow separation.

Other FFF techniques include (i) sedimentation FFF (SdFFF), where a gravitational/centrifugal cross force is applied perpendicular to the direction of the channel flow, (ii) electrical FFF (EFFF), where an electric field is applied perpendicular to the channel flow, and (ii) thermal FFF (ThFFF), where a temperature gradient is transversely applied.

Common to all these methods of field flow fractionation is a fluid, or mobile phase, into which is injected an aliquot of a sample whose separation into its constituent fractions is achieved by the application of a cross field. Many of the field flow fractionators allow for the control and variation of the strength of the cross field during the time the sample aliquot flows down the channel, be it electrical field, cross flow, thermal gradient, or other variable field.

Symmetric Flow Cross Flow Fractionator (SF1FFF)

As an illustration of the separation of particles by field flow fractionation, a simplification of perhaps the most straightforward system, a SF1FFF, is described. A sample is injected into an inlet port along with the spending mobile phase. The sample is allowed to undergo a so-called "relaxation phase," where there is no applied channel flow, but larger particles are forced further down the height of the channel than smaller particles by the constantly applied cross flow. Once the channel flow is resumed, the sample aliquot begins to undergo non-steric separation while it moves down the length channel with the smaller particles leading the larger ones, as they inhabit a region of the cross section of the channel flow nearer the center of the height of the channel where the channel flow is most swift. By increasing the cross flow rate, the separation of all species continues while the larger fractions begin to trail further behind their smaller sized companions. After exiting the channel through the outlet port the fractionated sample may be analyzed using various detectors.

Asymmetric Flow FFF (A4F)

An asymmetric flow FFF (A4F) is generally considered a variation of the earlier developed SF1FFF. An A4F channel assembly may include (1) a bottom assembly structure 150 holding a liquid-permeable frit surrounded by a sealing o-ring, (2) a permeable membrane that lies on frit, (3) a spacer of thickness from about 75 µm to 800 µm into which has been cut a cavity, and (4) a top assembly structure generally holding a transparent plate of polycarbonate material or glass.

The resulting sandwich is held together with bolts or other means, such as applied pressure adequate to keep the channel sealed against leaks, where such pressure may be applied by vise or clamping mechanism so long as it is able to provide relatively even pressure across the channel assembly such that no leaks occur. The generally coffin-shaped or tapered cavity in spacer serves as the channel in which separation will occur. The top assembly structure usually contains three holes, called ports, that pass through the top plate and are centered above the channel permitting the attachment of fittings thereto. These ports are (a) a mobile phase inlet port located near the beginning of the channel and through which is pumped the carrier liquid, the so-called mobile phase, (b) a sample port, downstream of the inlet port, into which an aliquot of the sample to be separated is introduced to the channel and focused thereunder, and (c) an exit port through which the fractionated aliquot leaves the channel near the end of the cavity.

Field flow fractionation (FFF) systems are commonly used to fractionate particles and molecules by applying a field to a fluid sample so that the particles accumulate against an accumulation wall. For Asymmetric Flow FFF (A4F), sample bearing fluid is passed through a semi-permeable membrane which allows the solvent to pass, but retains the sample. The membrane surface forms the accumulation wall and the flow through the membrane is called the cross flow. The Stokes force on the particles causes a flux that pushes the sample towards the membrane. Diffusion of the high concentration near the membrane creates a flux upwards that counteracts the Stokes force. The equilibrium of these fluxes gives rise to an exponential concentration profile, which is maximal on the membrane surface and decays into the bulk. Different size particles will have a different balance between these two fluxes. Large particles will have a large Stokes flux and a small diffusion flux compared to smaller particles, giving rise to a smaller exponential decay length. Both large and small particles have a maximal concentration on the wall, but the smaller ones protrude further into the bulk.

During the fractionation process, a channel flow is applied that is parallel to the planes. Pouiselle flow between the parallel plates produces a velocity shear at the boundary. The smaller particles, which protrude further into the bulk, travel downstream more rapidly than large particles and so elute first, followed by increasingly large particles. This is the well-known FFF mechanism.

Current Technology

Field flow fraction systems have seen moderate commercial success in recent years. The most popular variant of FFF is the asymmetric flow field flow fraction (AF4). However the AF4 market is a tiny compared to competitive fractionation techniques such as size exclusion chromatography (SEC). There are many reasons for this disparity. Part of it is that a modern AF4 system is substantially more expensive than a comparable SEC instrument. Another reason is that SEC is a very mature technology and is very easy to operate. In contrast FFF systems are more difficult to operate and require much more user intervention.

For example, in the early days of SEC, users would routinely buy empty columns and pack them manually. As the market matured, prepacked columns became consumables. The user orders a column from a catalog, connects it to their chromatograph, and begins running samples. The convenience and simplicity of prepacked columns has relegated hand-packing to realm of academic research. Moreover, since columns are made in factories dedicated to their construction their quality is much higher than can typically be achieved by manual packing.

In some sense the AF4 market place is still at the comparable stage of development as SEC when hand-packed columns were common. In order to use an AF4 channel, the user must disassemble the channel by removing a large number of bolts, clean the interior, install a new membrane, and laboriously reassembly the channel assembly. The assembly procedure includes using a torque wrench to tighten the bolts in a star-pattern to a specified torque. Then the user must flush the bubbles out and check for leaks. Finally the separation membrane often needs to be conditioned by injecting a sample that binds to non-specific binding sites to prevent subsequent samples from sticking to the membrane and having poor mass recovery.

Notably, a traditional variable height channel (VHC) for a FFF uses a separate spacer to set the channel height and to define the horizontal extent of channel. In a FFF with a VHC, the top plate presses on the spacer, which presses on the membrane, which in turn presses on the frit. With the VHC, one needs to carefully assemble with a torque wench to ensure that the top of the channel is parallel to the membrane and frit that form the bottom surface. If mistorqued one can break or crush the frit, or the channel can leak. In addition, a VHC often requires the spacer to be replaced as well as the membrane. Also, for a traditional channel design (e.g., a VHC), there is some variability in the thickness of the spacer. Since the performance depends sensitively on the channel thickness, variability in the channel thickness translates directly into variability of the performance. Also, a VHC forms the channel horizontal extent with a cutout in the spacer, resulting in the VHC assembly crushing the membrane during assembly. Also, fragile membranes can sometimes break near the edges.

In existing FFFs, a frit is pressed into a flat plastic top plate. Since the frit is an awkward shape (sort of like a baseball plate), it is challenging to get the frit installed without the solvent leaking around it. Thus, there is a need of a field flow fractionator.

Figure 1:
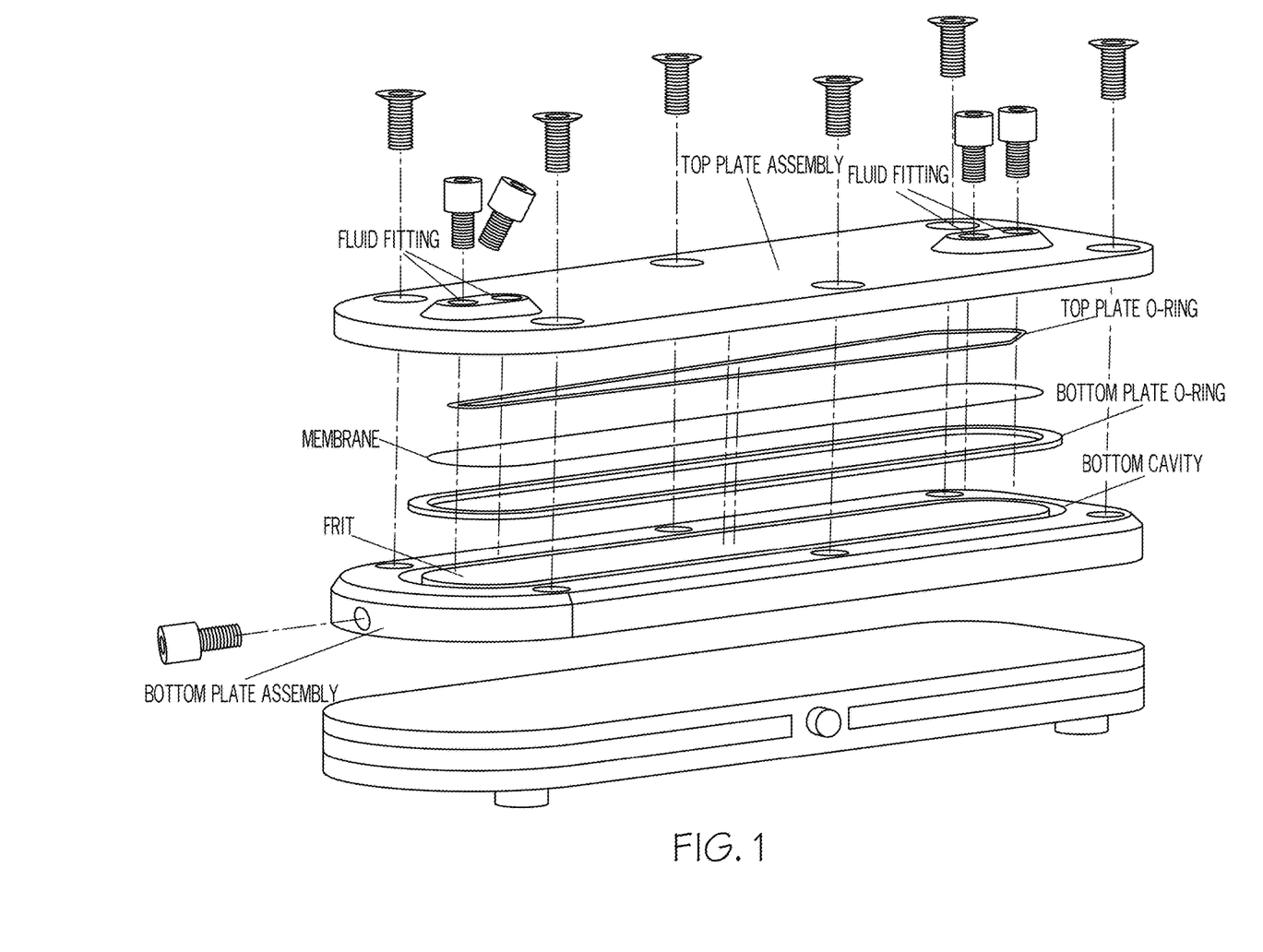
FIG. 1 depicts a field flow fractionator in accordance with an exemplary embodiment.
Figure 2A:
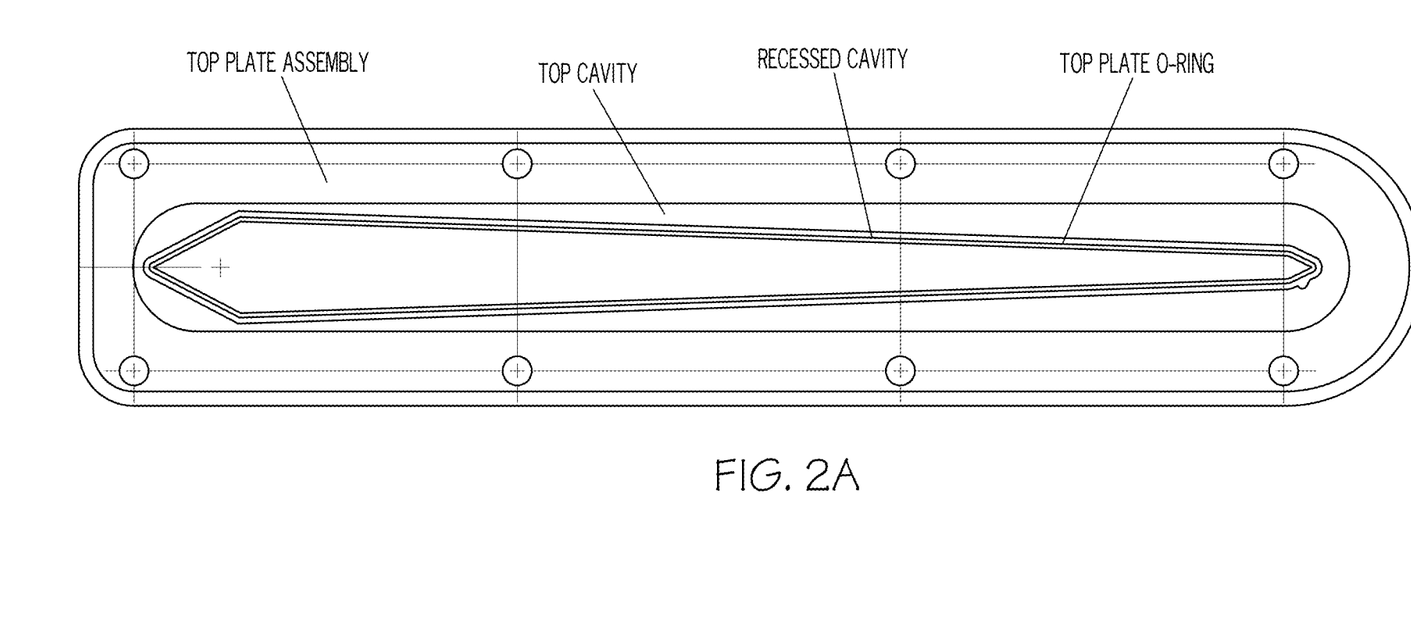
FIG. 2A depicts a field flow fractionator in accordance with an exemplary embodiment.

In an embodiment, FIG. 1, FIG. 2A. FIG. 2B, FIG. 2C, FIG. 2D, FIG. 3A, FIG. 3B, FIG. 3C, FIG. 3D, FIG. 4A, FIG. 4B, FIG. 4C, and FIG. 5 depict the field flow fractionator.

Figure 2B:
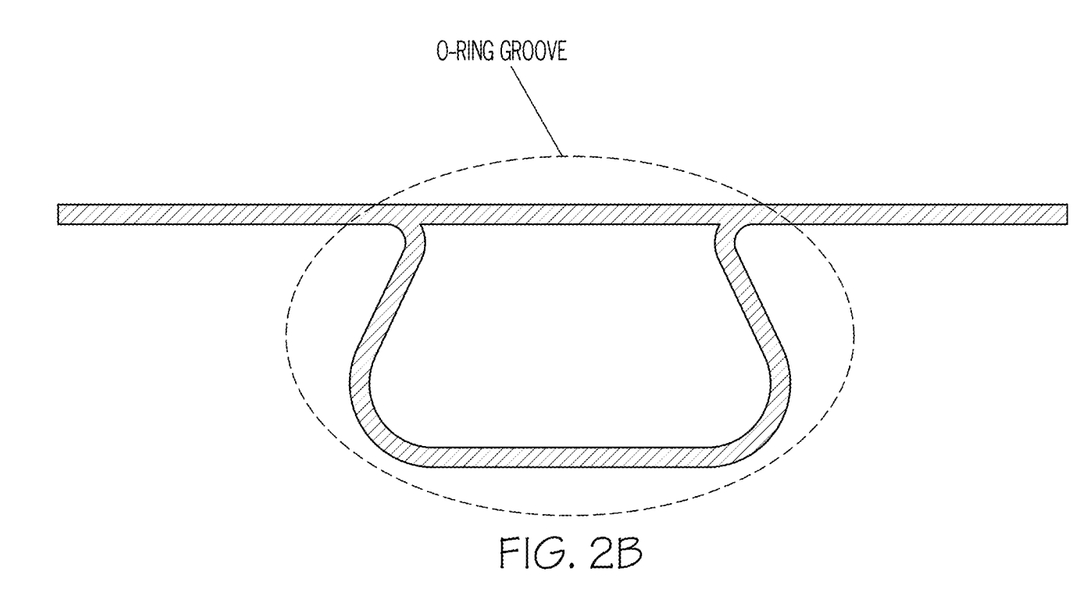
FIG. 2B depicts a field flow fractionator in accordance with an exemplary embodiment.
Figure 2C:
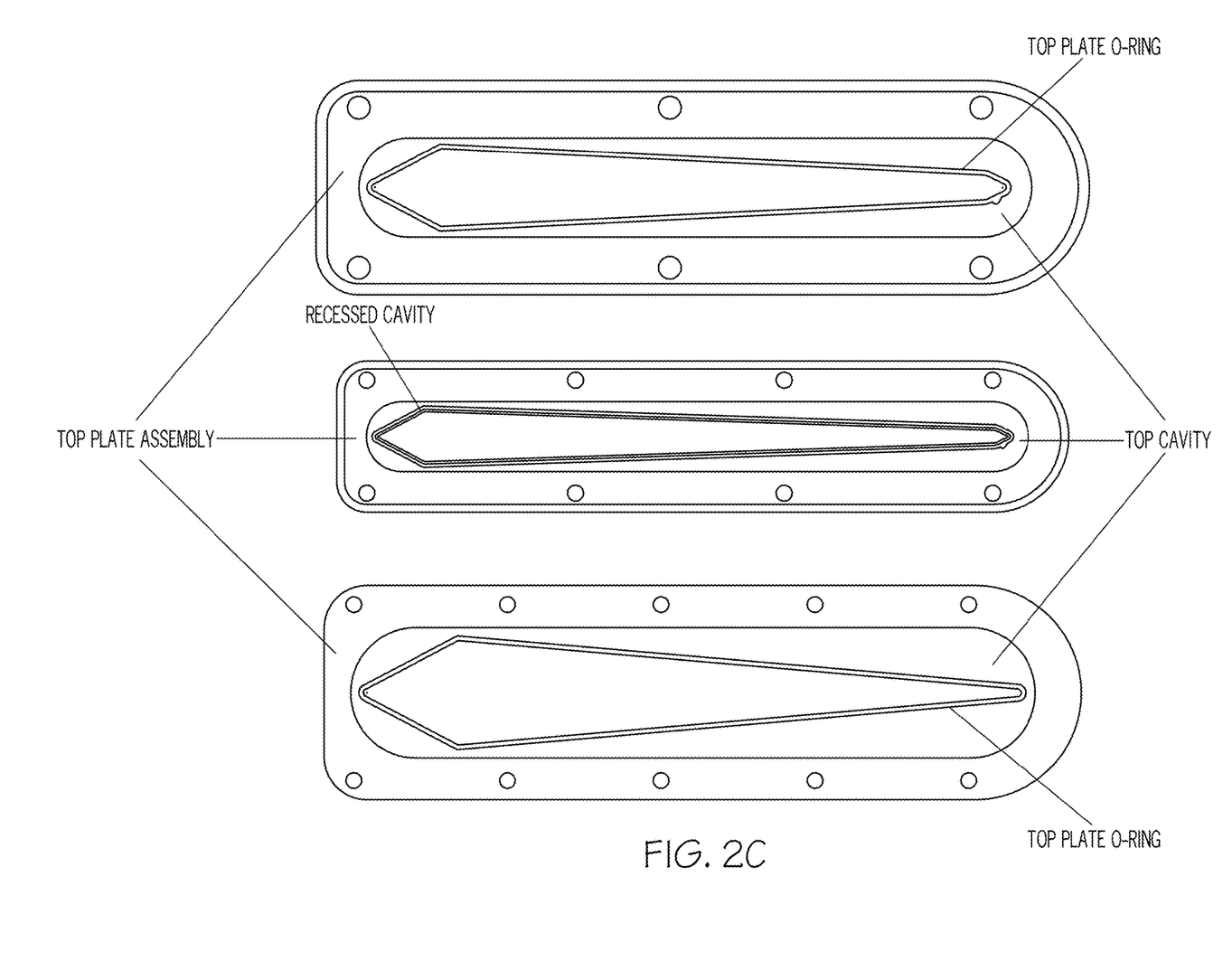
FIG. 2C depicts a field flow fractionator in accordance with an exemplary embodiment.
Figure 2D:
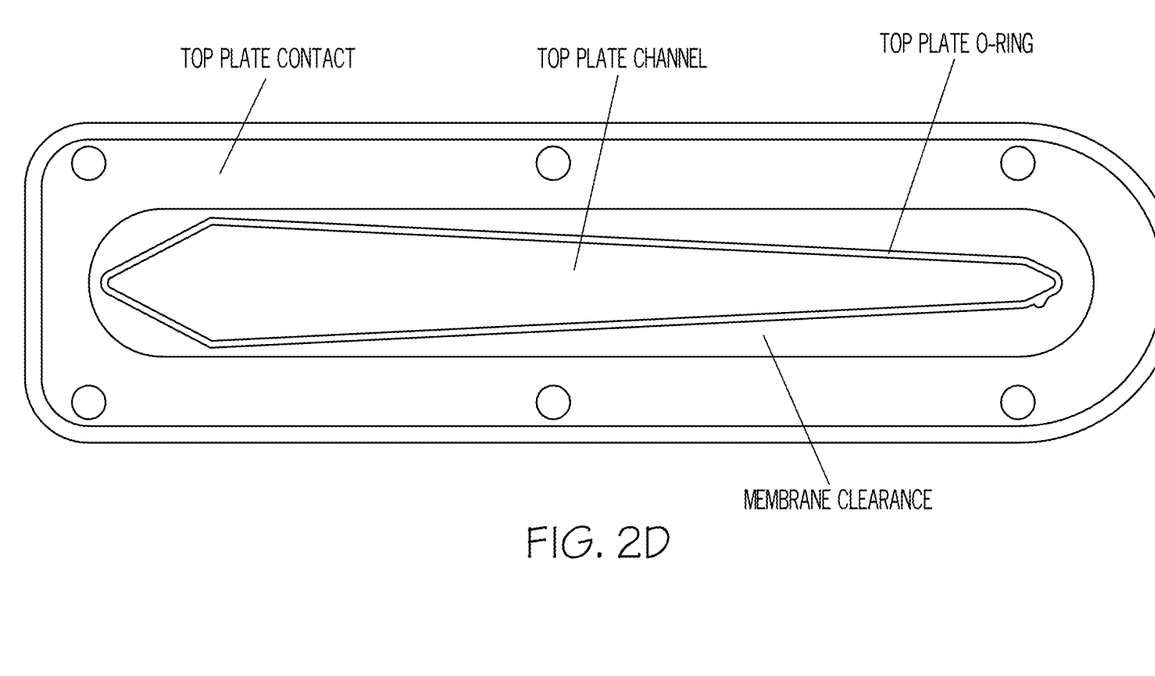
FIG. 2D depicts a field flow fractionator in accordance with an exemplary embodiment.

In an embodiment, FIG. 2A, FIG. 2C, and FIG. 2D depict the top plate assembly, where the o-ring defines the channel geometry, and where the depth of the membrane clearance/top cavity minus the thickness of the membrane is the channel spacing. For example, the nominal membrane thickness being 150 µm and the top plate channel depth being 500 µm correspond to an effective FFF channel depth of 500−150=350 µm. In an embodiment, the membrane clearance/top cavity is a shallow depression that ensures that only the o-ring touches the membrane, thereby preventing any hard surface from crushing the membrane and rupturing the delicate surface. In an embodiment, the bottom o-ring seals against the top plate contact surface, thereby sealing the channel against leaking out of the FFF.

Figure 3A:
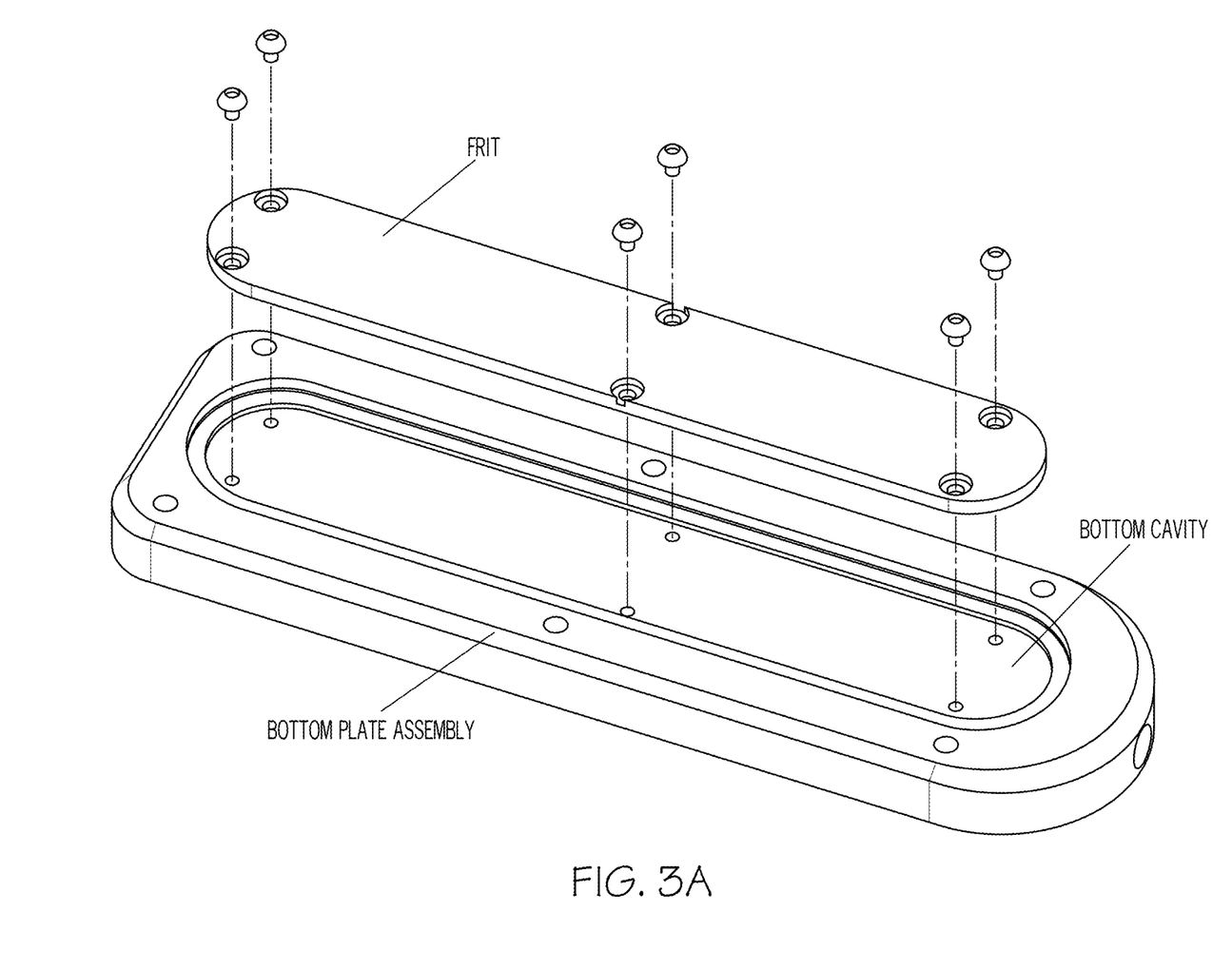
FIG. 3A depicts a field flow fractionator in accordance with an exemplary embodiment.
Figure 3B:
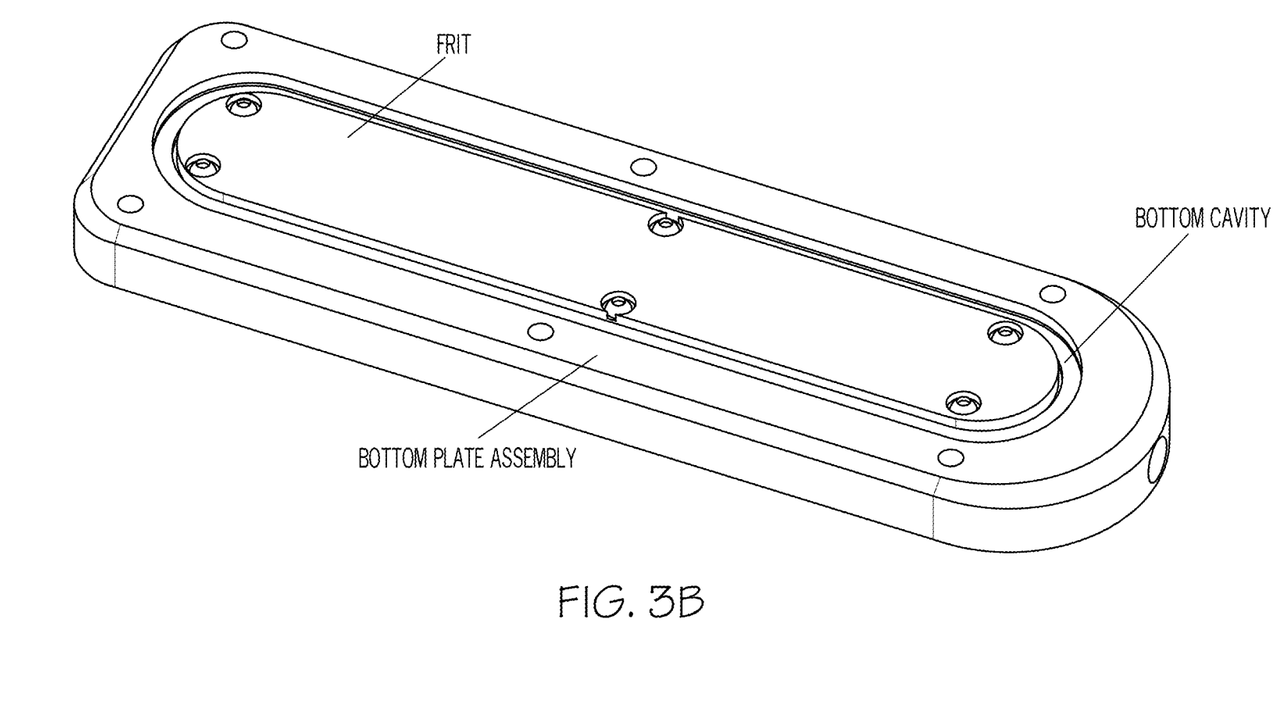
FIG. 3B depicts a field flow fractionator in accordance with an exemplary embodiment.
Figure 3C:
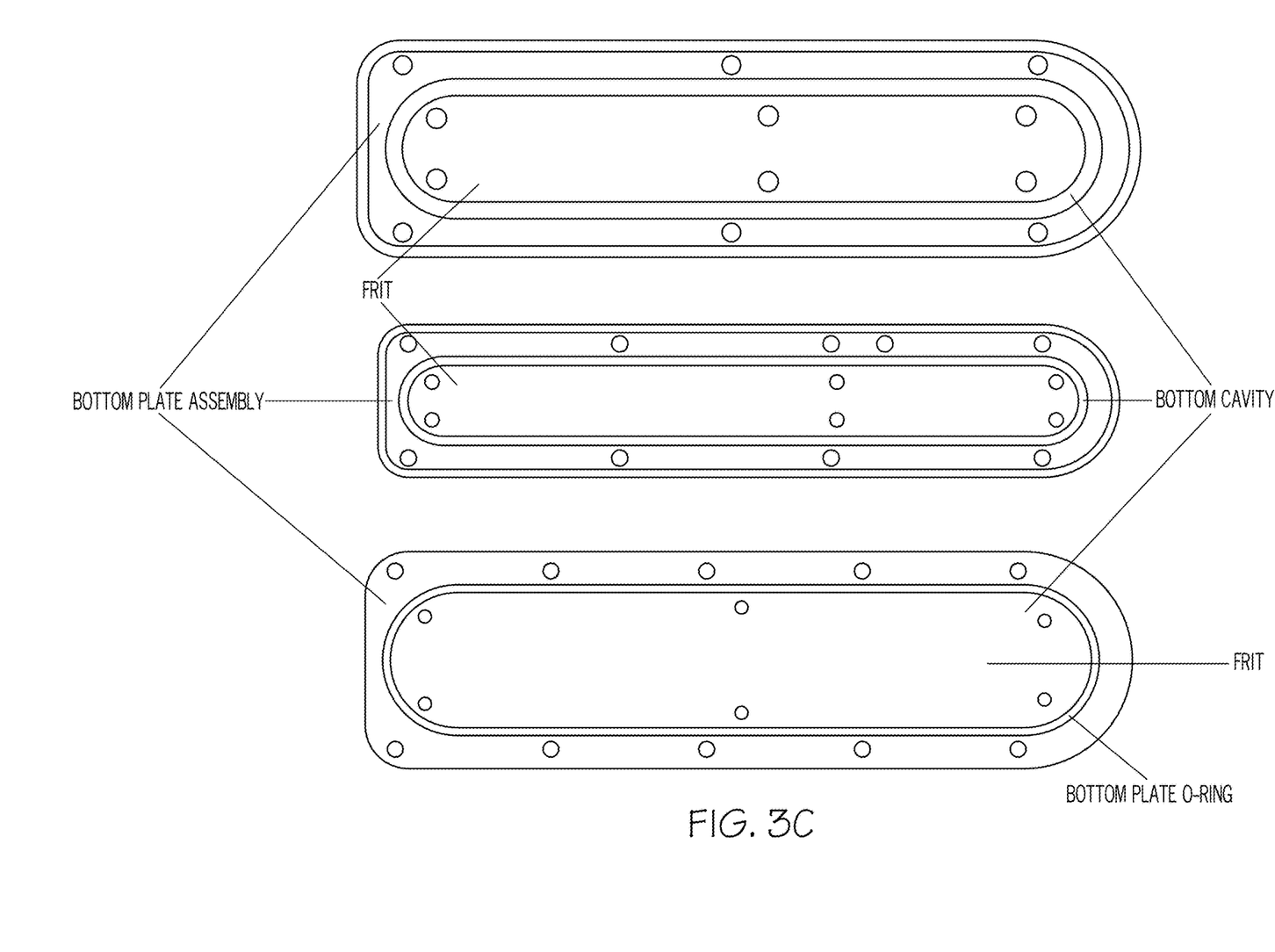
FIG. 3C depicts a field flow fractionator in accordance with an exemplary embodiment.
Figure 3D:
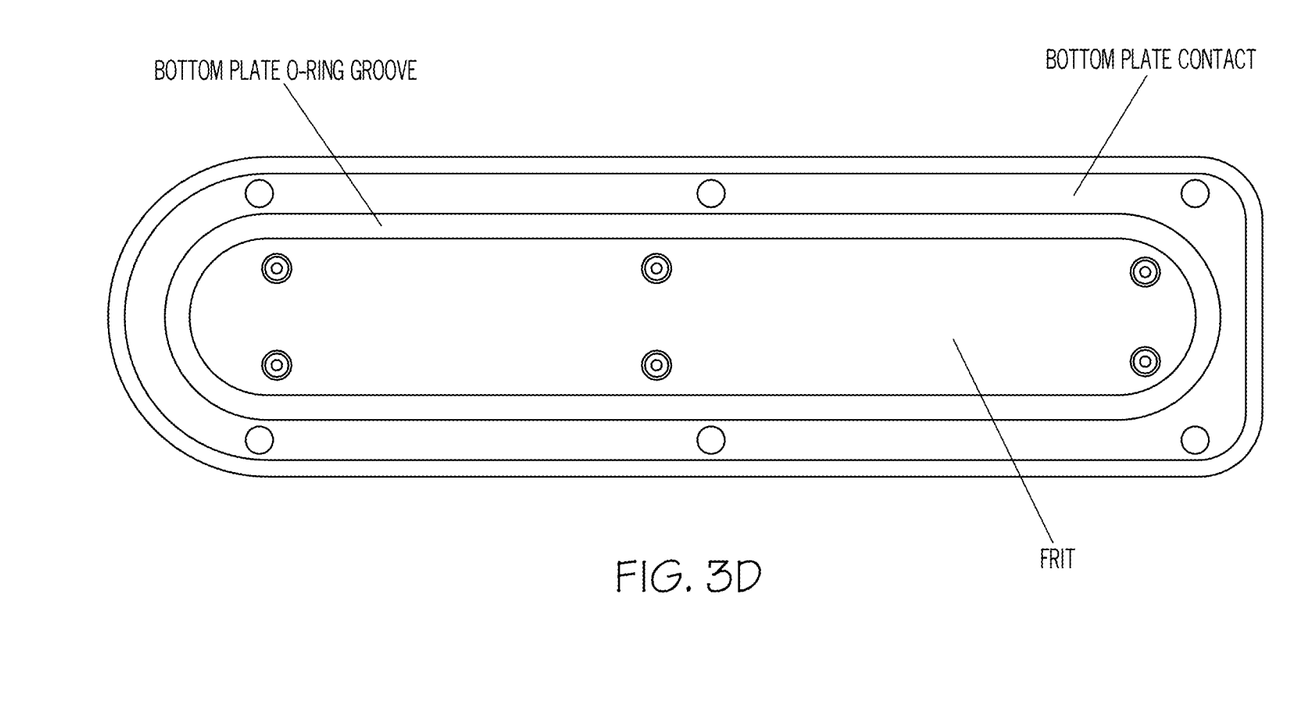
FIG. 3D depicts a field flow fractionator in accordance with an exemplary embodiment.

In an embodiment, FIG. 3D depicts the bottom plate assembly with frit installed. In an embodiment, the bottom plate and frit surfaces are ground flat while assembled to be accurately coplanar, such that the bottom plate contact is where the bottom o-ring seals.

Top Plate Assembly

In a further embodiment, as depicted in FIG. 2A, the top plate assembly further includes a recessed cavity. In an embodiment, the recessed cavity provides clearance for the membrane, so as to allow the membrane to avoid being crushed during the assembly of the FFF. In an embodiment, as depicted in FIG. 2B, the recessed cavity is the dove tail o-ring groove. In an embodiment, the top plate assembly includes at least one window. In an embodiment, the at least one window provides an optical channel, allowing for verifying proper operation of the channel.

Alignment

In further embodiment, as depicted in FIG. 1, FIG. 2A, FIG. 2C, FIG. 2D, FIG. 3A, FIG. 3B, FIG. 3B, FIG. 3C, FIG. 3D, the bottom plate assembly further includes at least two pins, and the top plate assembly further includes at least two holes, where the at least two pins are configured to mate with the at least two holes, thereby aligning the bottom plate assembly with the top plate assembly. In a further embodiment, as depicted in FIG. 1, FIG. 2A, FIG. 2C, FIG. 2D, FIG. 3A, FIG. 3B, FIG. 3B, FIG. 3C, FIG. 3D, the top plate assembly further includes at least two clearance holes configured to mate with at least two flat-bottom bolts and the bottom plate assembly further includes at least two thread holes configured to mate with the at least two flat-bottom bolts, thereby clamping the top plate assembly with the bottom plate assembly.

Figure 4A:
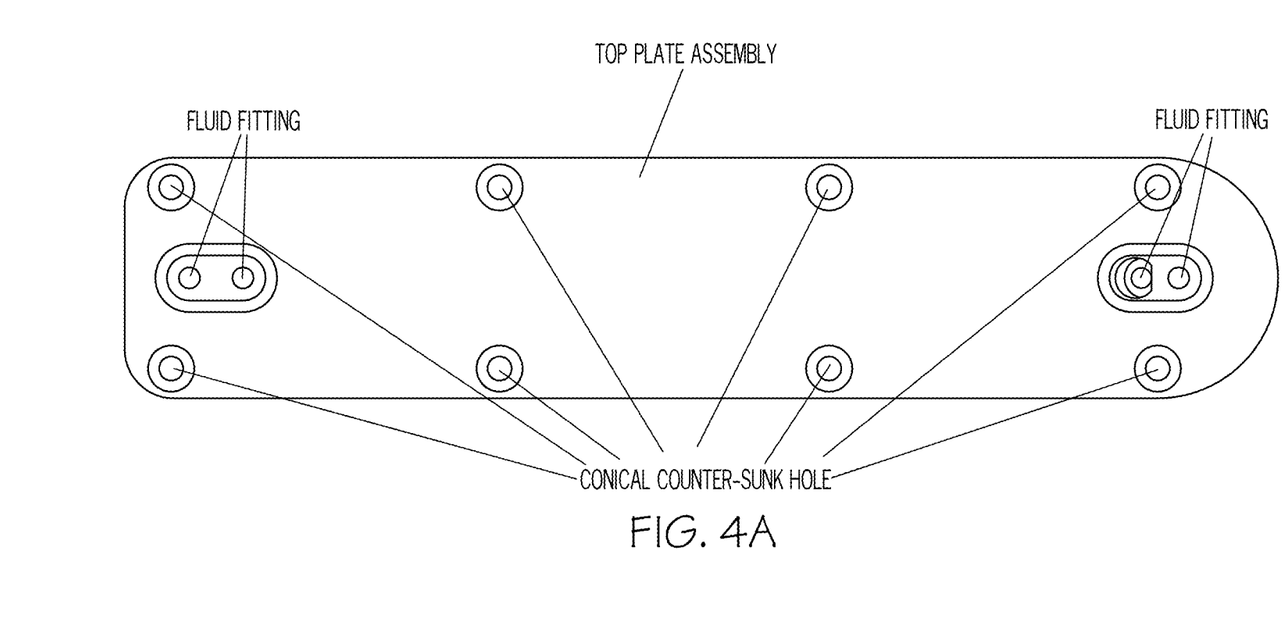
FIG. 4A depicts a field flow fractionator in accordance with an exemplary embodiment.
Figure 4B:
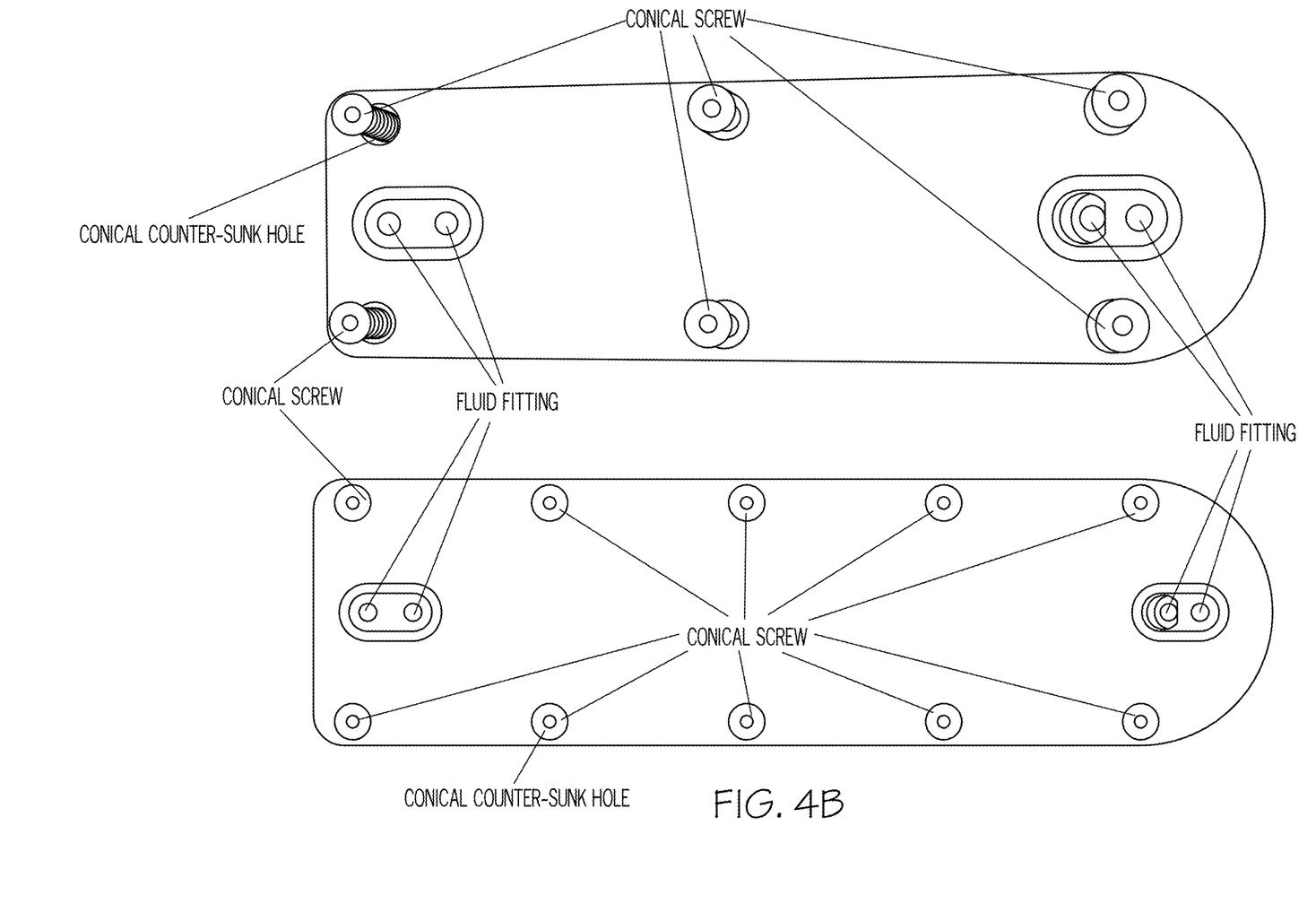
FIG. 4B depicts a field flow fractionator in accordance with an exemplary embodiment.
Figure 4C:
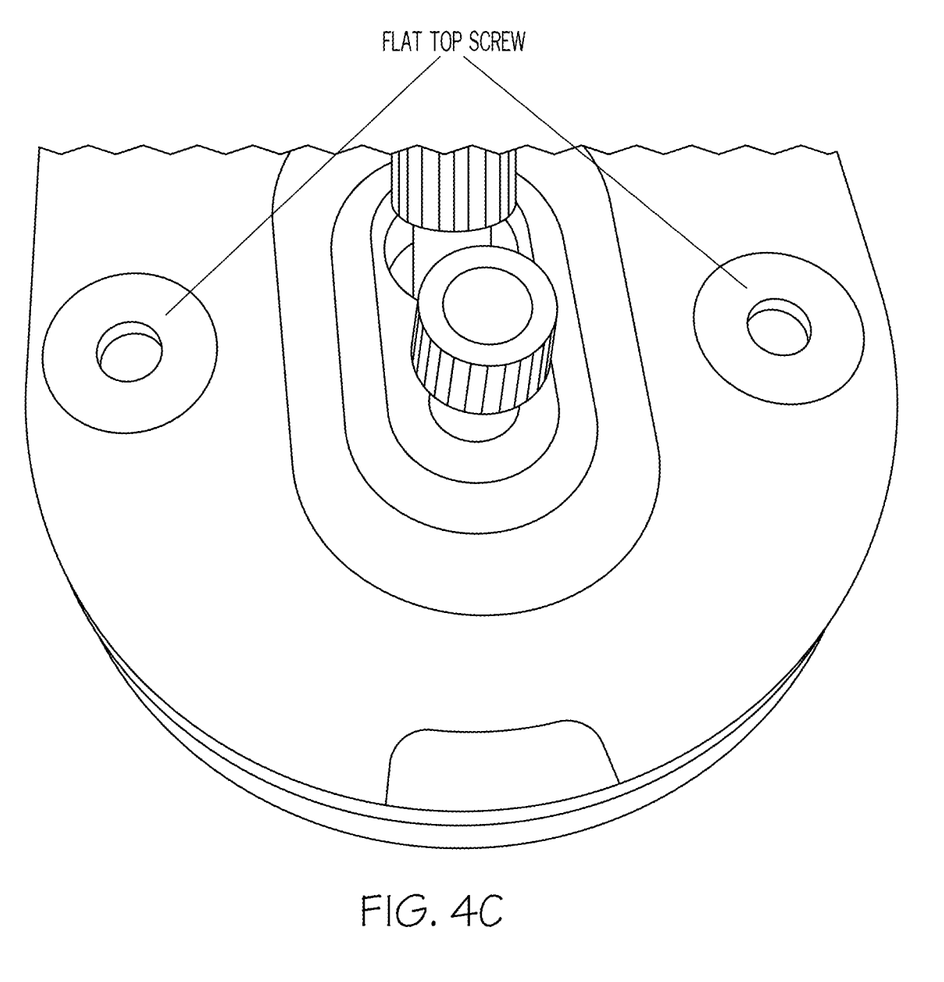
FIG. 4C depicts a field flow fractionator in accordance with an exemplary embodiment.

In further embodiment, the top plate assembly further includes at least two conical, counter-sunk holes configured to mate with at least two conical screws, thereby aligning the top plate assembly with the bottom plate assembly, as depicted in FIG. 4A, FIG. 4B, and FIG. 4C. In an embodiment, the at least two conical screws are flat-head screws.

In an embodiment, FIG. 4B depicts the top of a completed FFF assembly. In an embodiment, the top plate assembly and the bottom plate assembly could be aligned in two ways. In an embodiment, in the first way, shown in FIG. 4B, the top plate assembly has counter sunk features that accept flat top screws, where cones/conical holes on the top plate assembly automatically align with the cone/conical screws to simultaneously align and secure the top plate assembly to the bottom plate assembly.

In further embodiment, the bottom plate assembly further includes at least two pins, and the top plate assembly further includes at least one hole and at least one slot, where an axis of the at least one slot is aligned with a center of the at least one hole, where the at least two pins are configured to mate with the at least one hole and the at least one slot, thereby aligning the bottom plate assembly with the top plate assembly. In an embodiment, the at least one slot has tight tolerances along the axis of the at least one slot.

In an embodiment, the FFF has at least two pins on either the top plate assembly or the bottom plate assembly and two receiving holes on the other plate. If the FFF were an Electrical FFF with an electrical channel, this way with pins could be used with insulating pins since the top and bottom plate assembly would have to be electrically isolated. In an embodiment, instead of two pins and two holes, the FFF could use two pins and a hole and a slot in order to align the bottom plate assembly and top plate assembly. In an embodiment, FIG. 4C depicts an assembled FHC using flat top screws.

Bolts and Latches

In a further embodiment, the field flow fractionator further includes bolts to seal the channel and to position a bottom surface of the top plate assembly, the spacer, the membrane, and a top surface the bottom plate assembly to be parallel to each other. In an embodiment, FIG. 1 depicts the field flow fractionator and the bolts. In a further embodiment, the field flow fractionator further includes washers configured to electrically insulate the bolts from the top plate assembly.

In a further embodiment, the field flow fractionator further includes spring latches to seal the channel and to position a bottom surface of the top plate assembly, the spacer, the membrane, and a top surface the bottom plate assembly to be parallel to each other.

Sensors

In a further embodiment, the field flow fractionator further includes a memory configured to store data relating to the field flow fractionator, where the data includes at least one of a channel geometry, a manufacture date, a membrane chemistry, a construction date, a first wetted date, a number of injections, a number of solvents used, types of solvents used, and a number of samples fractionated. In an embodiment, the memory is a radio frequency identification chip (RFID chip). For example, the channel geometry could describe the length, the width, and/or the thickness of the channel. Also, for example, the manufacture date could describe the date that the field flow fractionator was manufactured. As a further example, the membrane chemistry could describe the type of membrane, the porosity of the membrane, and the molecular weight cutoff of the membrane. For example, the construction date could describe the date that the field flow fractionator was constructed.

Also, for example, the first wetted date could describe the date that the field flow fractionator was first wetted. As a further example, the number of injections could describe the number of injections that have been introduced to the field flow fractionator. For example, the number of solvents used could describe the number of solvents used in the field flow fractionator. Also, for example, the types of solvents used could describe the types of solvents used in the field flow fractionator. As a further example, the number of samples fractionated could describe the number of samples fractionated by the field flow fractionator.

In a further embodiment, the field flow fractionator further includes at least one environmental sensor configured to measure at least one of a temperature of a solvent flowing through the channel, a pH value of the solvent flowing through the channel, and a conductivity value of the solvent flowing through the channel. In a further embodiment, the field flow fractionator further includes an assembly sensor configured to detect a date of assembly of the field flow fractionator. For example, the assembly sensor could include a Hall-effect sensor on one side of the assembly sensor and a magnet on another side of the assembly sensor. Also, for example, the assembly sensor could be microswitch/button that could be depressed upon assembly of the field flow fractionator. As another example, the assembly sensor could be an electrical circuit that has an electrical circuit path that is completed upon the assembly of the field flow fractionator. The information from the assembly sensor could be used to limit the number of uses of the field flow fractionator for quality control purposes, due to the aging of the field flow fractionator through use.

Fixed Height Dispersion Inlet Channel

Figure 5:
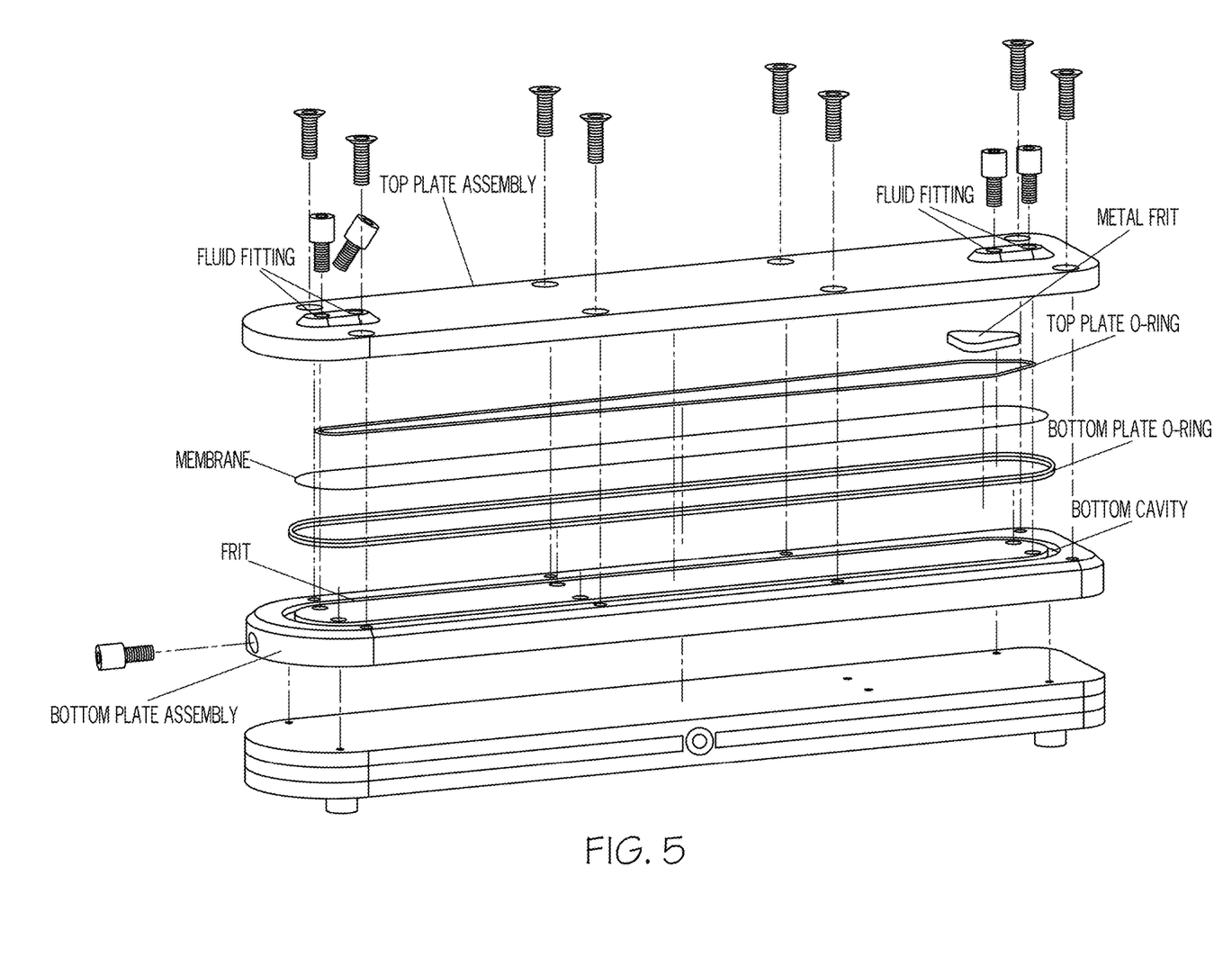
FIG. 5 depicts a field flow fractionator in accordance with an exemplary embodiment.

In an embodiment, as depicted in FIG. 5, the field flow fractionator includes a fixed height dispersion inlet channel, where there is a pocket in the upper plate/top plate assembly into which a metal frit is welded. In an embodiment, flow through this metal frit acts as a flow distributor that pushes the sample against the separation membrane, acting as a "frit inlet" system. In an embodiment, the metal frit is welded in place, thereby preventing the sample from bypassing the metal frit. In an embodiment, the fixed height dispersion inlet channel has no spacer, has no metal-to-metal contact, eliminates the need for a torque wrench, and has lower consumable cost, while also having the simplified operation of the dispersion inlet channel via the metal frit.

Example

In an embodiment, the FFF/AF4 channels can be mass-produced in such a way that like catalog SEC columns, they can be considered consumables. Since the channels will be assembled and tested in the factory, the user is freed from labor and time intensive assembly, leak-checking, and membrane conditioning steps. Since the channels will be consumable elements, the design can be simplified considerably by using molded components that are assembled with inseparable techniques such as gluing, overmolding, thermal and ultrasonic welding. This eliminates the need for o-rings, spacers, and fasteners that need to be adjusted to specific torque settings.

The present disclosure describes a fixed height channel (FHC) for a FFF, that is essentially a reusable channel constructed from machined stainless steel or Platinum coated Titanium for the Mobility Channel variant. In an embodiment, the field flow fractionator could provide several benefits. For example, the FFF with a FHC could be easier to assemble compared to a VHC. The FHC top plate is screwed down directed on the bottom plate assembly. Since the FHC has a hard stop, it does not need a torque wrench and always seals and insures that the top and bottom of the channel are accurately parallel.

Also, in an embodiment, the FFF with a FHC could result in a lower consumable cost. For example, the FFF with a FHC only requires that the membrane be replaced. In addition, in an embodiment, the FFF with a FHC could result in superior reproducibility. For example, since the FFF with a FHC does not have a separate spacer, the assembly-to-assembly performance could be superior. Also, in an embodiment, the FFF with a FHC could use fragile membranes. For example, since the FFF with a FHC defines the channel horizontal extent with an o-ring, the FFF with a FHC only compresses the membrane with a rubber o-ring which is much less prone to damage.

In addition, in an embodiment, the FFF with a FHC could result in improved manufacturability. For example, with the FFF with a FHC, the bottom plate is constructed by attaching the frit to the bottom assembly so that the composite can be ground flat, guaranteeing that the top of the bottom assembly and top of the frit are accurately co-planar, where the only dimensional tolerance in the completed channel assembly is from the top plate. As a result, for example, only the channel recess in the top plate would have to be machined to high accuracy, where the bottom plate could be considered a plane.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A field flow fractionator comprising:
   a top plate assembly comprising
      a first non-corrosive material,
      at least three fluid fittings machined into the first non-corrosive material, a top cavity machined into the first non-corrosive material, and
      at least one top plate o-ring configured to form a horizontal geometry of a separation channel;
   a membrane;
   a bottom plate assembly comprising a second non-corrosive material,
      a bottom cavity machined into the second non-corrosive material, a frit configured to be placed into the bottom cavity, and
      at least one bottom plate o-ring configured to seal the bottom plate assembly to the top plate assembly,
      such that a top surface of the second non-corrosive material and a top surface of the frit are machined to be coplanar; and
   wherein the top plate assembly, the membrane, and the bottom assembly define the separation channel, wherein the top plate assembly is configured to be in direct contact with the bottom plate assembly upon assembly of the field flow fractionator.

2. The field flow fractionator of claim 1 wherein the top plate assembly further comprises a recessed cavity.

3. The field flow fractionator of claim 1
wherein the bottom plate assembly further comprises at least two pins, wherein the top plate assembly further comprises at least two holes,
wherein the at least two pins are configured to mate with the at least two holes, thereby aligning the bottom plate assembly with the top plate assembly.

4. The field flow fractionator of claim 3
wherein the top plate assembly further comprises at least two clearance holes configured to mate with at least two flat-bottom bolts,
wherein the bottom plate assembly further comprises at least two thread holes configured to mate with the at least two flat-bottom bolts,
thereby clamping the top plate assembly with the bottom plate assembly.

5. The field flow fractionator of claim 1
wherein the top plate assembly further comprises at least two conical, counter-sunk holes configured to mate with at least two conical screws, thereby aligning the top plate assembly with the bottom plate assembly.

6. The field flow fractionator of claim 5 further comprising washers configured to electrically insulate the bolts from the top plate assembly.

7. The field flow fractionator of claim 1
wherein the bottom plate assembly further comprises at least two pins,
wherein the top plate assembly further comprises at least one hole and at least one slot,
wherein an axis of the at least one slot is aligned with a center of the at least one hole,
wherein the at least two pins are configured to mate with the at least one hole and the at least one slot, thereby aligning the bottom plate assembly with the top plate assembly.

8. The field flow fractionator of claim 1 further comprising bolts to seal the channel and to position a bottom surface of the top plate assembly, the membrane, and a top surface of the bottom plate assembly to be parallel to each other.

9. The field flow fractionator of claim 1 further comprising spring latches to seal the channel and to position a bottom surface of the top plate assembly, the membrane, and a top surface of the bottom plate assembly to be parallel to each other.

10. The field flow fractionator of claim 1 further comprising a memory configured to store data relating to the field flow fractionator,
wherein the data comprises at least one of a channel geometry, a manufacture date, a membrane chemistry, a construction date, a first wetted date, a number of injections, a number of solvents used, types of solvents used, and a number of samples fractionated.

11. The field flow fractionator of claim 1 further comprising at least one environmental sensor configured to measure at least one of a temperature of a solvent flowing through the channel, a pH value of the solvent flowing through the channel, and a conductivity value of the solvent flowing through the channel.

12. The field flow fractionator of claim 1 further comprising an assembly sensor configured to detect a date of assembly of the field flow fractionator.

* * * * *